United States Patent [19]

Miyairi

[11] Patent Number: 4,488,211
[45] Date of Patent: Dec. 11, 1984

[54] HARMONIC AND PULSATION REDUCING CIRCUIT USED IN A MULTIPLEX POLYPHASE RECTIFIER CIRCUIT

[76] Inventor: Shota Miyairi, No. 5-3-10, Kamiuma, Setagaya-ku, Tokyo, Japan

[21] Appl. No.: 408,890

[22] Filed: Aug. 17, 1982

[30] Foreign Application Priority Data

Mar. 31, 1982 [JP] Japan .................................. 57-50939

[51] Int. Cl.³ .......................... H02M 7/17; H02M 1/00
[52] U.S. Cl. ........................................ 363/45; 363/64; 363/40; 363/65
[58] Field of Search ..................... 363/3, 5-7, 363/37, 39-40, 44-48, 64-65, 69-70, 128-130, 135-138

[56] References Cited

U.S. PATENT DOCUMENTS

| | | | |
|---|---|---|---|
| 2,082,015 | 6/1937 | Ludwig et al. | 363/64 |
| 2,759,140 | 8/1956 | Lewis | 363/64 |
| 3,308,368 | 3/1967 | Schmidt, Jr. | 363/5 |
| 4,366,532 | 12/1982 | Rosa et al. | 363/129 X |

Primary Examiner—Peter S. Wong

[57] ABSTRACT

A harmonic and pulsation reducing circuit used in multiplex polyphase rectifier circuits such as a multiplex polyphase rectifier, a branch reactor, an external commutated invertor, etc. which is characterized in that a rectifier circuit to rectify the induced voltage of a secondary winding provided at interphase reactors interposed between other plural rectifier circuits is connected between the center of the interphase reactors and loads or a DC power source so that the rectified voltage may be superposed on the DC output voltage of the said plural rectifier circuits or the other DC power source.

3 Claims, 13 Drawing Figures (a)

(b)

HARMONIC AND PULSATION REDUCING CIRCUIT USED IN A MULTIPLEX POLYPHASE RECTIFIER CIRCUIT

BACKGROUND OF THE INVENTION

The present invention relates to a harmonic and pulsation reduction circuit used in a multiplex polyphase rectifier circuit and more particularly to an improvement therein which can reduce harmonics and pulsations in a multiplex polyphase rectifier, a branch reactor, an external commutated invertor, respectively having multiplex polyphase rectifier circuits.

As rectifiers have become more popular and the capacity thereof increased in recent years, harmonics from a rectifier presents a problem. Although various countermeasures to solve the problem by making a rectifier polyphase or multipulse or by using a filter have been proposed, they are not desirable as they tend to push cost considerably.

Explanation is given first to a kind of multiples polyphase rectifiers, a double three-phase 12-pulse rectifier having a double three-phase 12-pulse rectifier circuit comprising a combination of a star connection and a delta connection.

FIG. 1 is a circuit diagram showing a double three-phase 12-pulse rectifier. As indicated in the figure, a three-phase bridge rectifier circuit 1 having thyristors $T_1$ to $T_6$ as the rectifying device is connected to one of the secondary windings in star connection of a transformer while a three-phase bridge rectifier circuit 3 having thyristors $T_7$ to $T_{12}$ as the rectifying devices is similarly connected to the other secondary windings 4 in delta connection of the transformer. The three-phase bridge rectifier circuits 1 and 3 are connected to each other via an interphase reactor 5a to supply DC current to a load 7 which is connected via a smoothing reactor 6 at the central point A of the interphase reactor 5a. In the figure the reference numeral 8 denotes a primary winding of the transformer.

The waveforms of the voltage $V_m$ which is to be applied to the interphase reactor 5a at the normal operation of the double three-phase pulse rectifier and of the voltage $e_{da}$ between terminals A,B may vary depending on the phase-control angles $\alpha$ of the thyristors $T_1$ to $T_{12}$ as below:

(1) When the phase control angle $\alpha$ is as small as almost 0°, the waveforms of the voltages $e_{da}$ and $V_m$ will become as shown in FIG. 2(a) and FIG. 2(c). The voltage $e_{da}$ contains pulsation of 12f (f denotes a power source frequency) as indicated in FIG. 2(b) and the voltage $V_m$ becomes a triangular wave.

(2) When the phase control angle $\alpha$ is as large as almost 90°, the waveforms of the voltages $e_{da}$ and $V_m$ will become as shown in FIG. 3(a) and FIG. 3(b). The voltage $e_{da}$ contains sawtooth pulsation of 12f as shown in FIG. 3(a) while the voltage $V_m$ becomes substantially square waveform as shown in FIG. 3(b).

In prior art only feasible method to reduce the pulsation of, in this example, 12f contained in the voltage $e_{da}$ is achieved by twining to said circuit, for instance by using the quadruple zigzag-star connection as mentioned above.

SUMMARY OF THE INVENTION

In view of such conventional difficulties as mentioned above, the present invention aims at providing a harmonic and pulsation reducing circuit which can not only reduce the harmonic of the AC input current $i_s$ and pulsation of the voltage $e_{da}$ but also can control a reactive current by fixing the phase control angle $\alpha$ of the rectifier at 90° when applied to a multiplex polyphase rectifier having a multiplex polyphase rectifying circuit comprising plural rectifying circuits and an interphase reactor, an external commutated invertor of similar type, etc. In order to attain such objects, the present invention is based upon the technical concept to provide a secondary winding to an interphase reactor and to use a rectified voltage obtained by rectifying the voltage induced on the secondary winding.

BRIEF DESCRIPTION OF THE DRAWINGS

FIG. 2(a) and FIG. 3(a) show the waveforms of the DC output voltages.

FIG. 2(b) shows the waveform of the pulsation component thereof.

FIG. 2(c) and FIG. 3(b) show the waveforms of the voltage between the interphase reactors shown in FIG. 1.

FIG. 2(d) and FIG. 3(c) show the waveforms of the voltages generated in the full-wave rectifier circuit of the circuit shown in FIG. 4.

FIG. 2(e) and FIG. 3(d) show the waveforms of the DC output voltages of the circuit shown in FIG. 4 which are obtained by superposing the voltages shown in FIG. 2(d) and FIG. 3(c) upon the voltage shown in FIG. 2(a) and FIG. 3(a), wherein FIG. 2(a) to FIG. 2(e) show the cases of smaller phase control angle $\alpha$, while FIG. 3(a) to FIG. 3(d) show the cases of larger phase control $\alpha$.

DETAILED DESCRIPTION OF PREFERRED EMBODIMENTS

The present invention will now be described in detail referring to embodiments shown in attached drawings.

Figure 1:
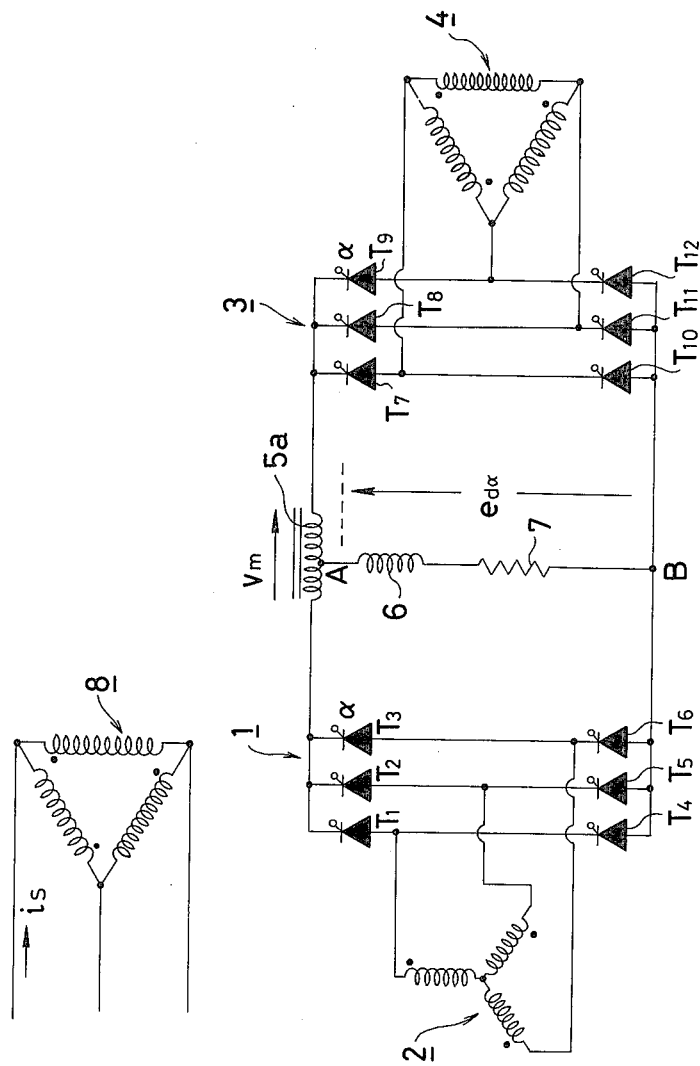
FIG. 1 is a circuit diagram to show a double three-phase rectifier of prior art.
Figure 4:
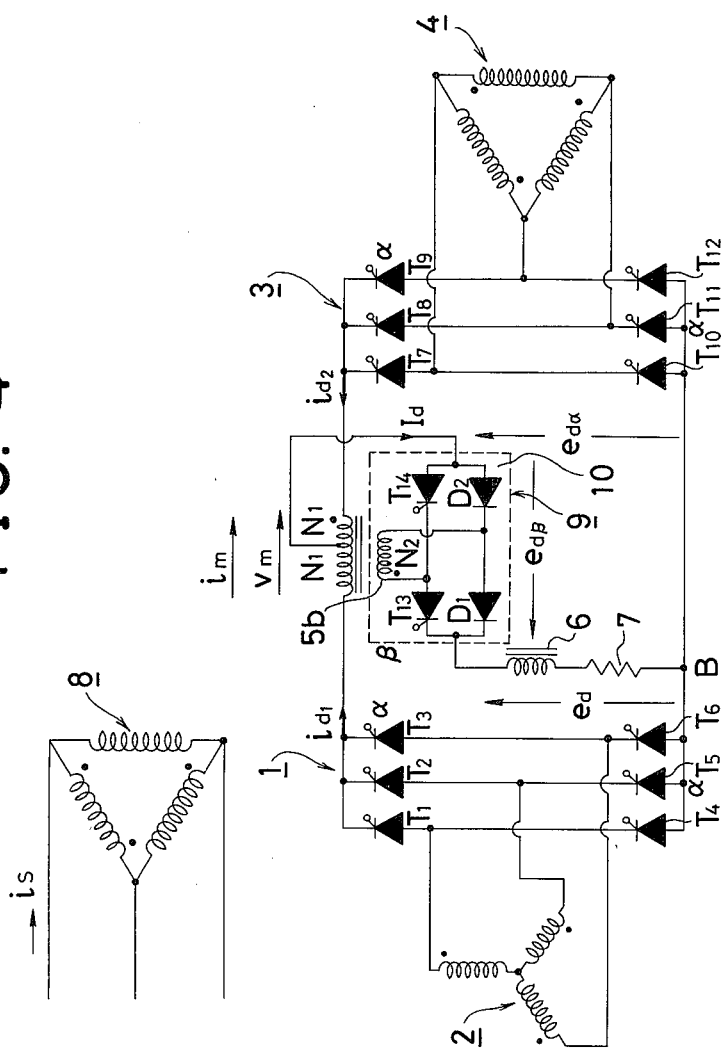
FIG. 4 is a circuit diagram to show an embodiment of the present invention applied for the double three-phase 12 pulse rectifier of FIG. 1.

FIG. 4 is a circuit diagram of an embodiment of the present invention applied to the double three-phase 12 pulse rectifier shown in FIG. 1. The parts identical with those of FIG. 1 are referred to as identical reference numerals and description for such duplicated parts are omitted. As shown in FIG. 4, the harmonic and pulsation reducing circuit 9 according to the present invention includes a secondary winding 5b provided on an interphase reactor 5a and a full rectifier circuit 10 which conducts the full-wave rectification of the voltage induced at the secondary winding 5b. The circuit 9 is connected between the central point A of the said interphase reactor 5a and a smoothing reactor so as to superpose the rectifier voltage $e_{d\beta}$ based on the said induced voltage upon the existing voltage $e_{da}$. The said full-wave rectifier circuit 10 comprises a hybrid bridge full-wave rectifier circuit having thyristors $T_{13}$ and $T_{14}$ and diodes $D_1$ and $D_2$.

Figure 2:
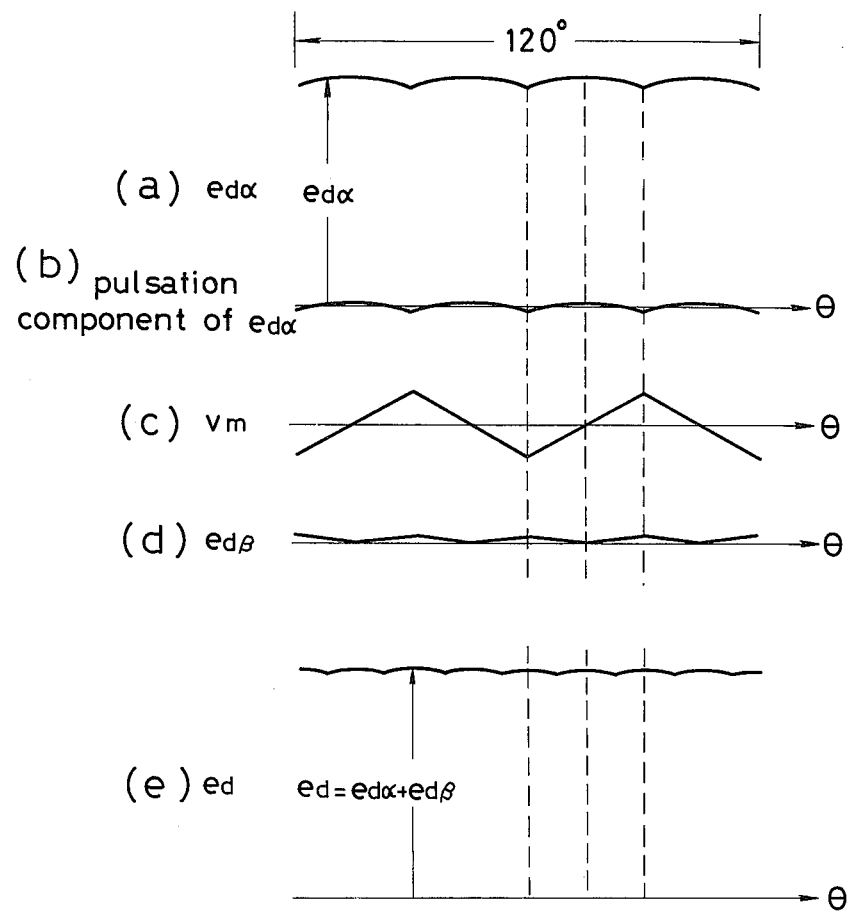

Since the rectifier voltage $e_{d\beta}$ generated in the circuit according to the present invention is the one obtained by full-wave rectifying the voltage $V_m$ applied on the interphase reactor 5a, (1) when the phase control angle $\alpha$ of the thyristors $T_1$ to $T_{12}$ is small and close to 0°, the voltage $e_{d\beta}$ becomes as shown in FIG. 2(d). The said voltage $V_m$ (refer to FIG. 2(c)) at this time is in the phase opposite to the pulsation component (FIG. 2(b)) of the voltage $e_{d\alpha}$ (FIG. 2(a)) between terminals A and B and the amplitude thereof is about 4-fold. If the turn ratio between the interphase reactor 5a and the secondary winding 5b provided thereon is $N_2/2N_1=a_m=0.25$, the DC output voltage of the double three-phase 12 pulse rectifier obtained by superposing a rectifier voltage $e_{d\beta}$ upon the voltage $e_{d\alpha}$, $e_d=e_{d\alpha}+e_{d\beta}$, becomes as shown in FIG. 2(e). The pulsation component in the voltage mentioned above is considerably reduced to have a waveform substantially equal to that obtainable when the number of the phase is doubled to 24.

Figure 3:
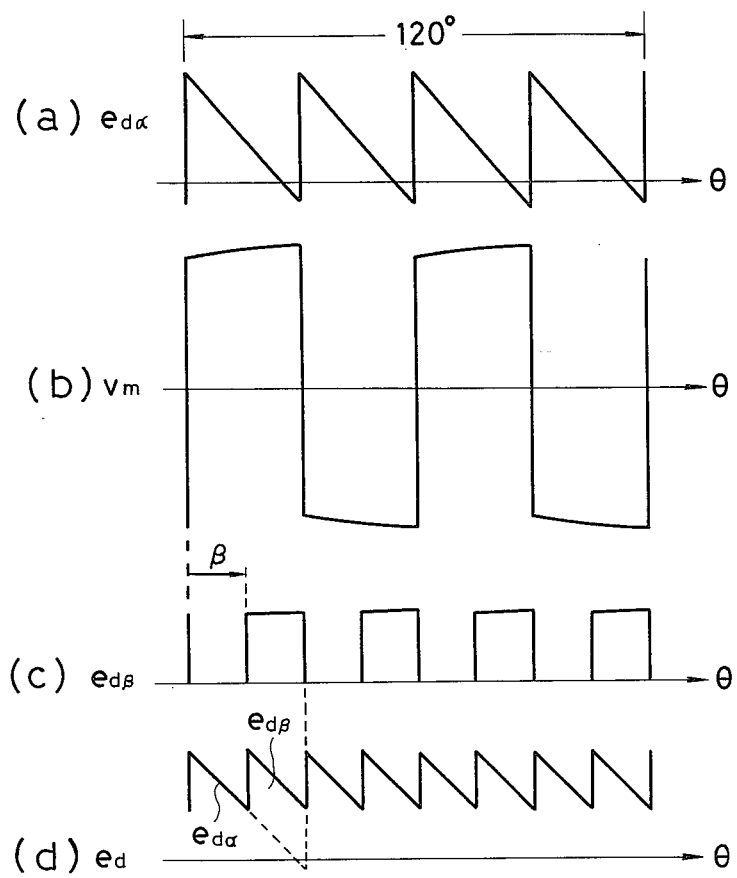

(2) when the phase control angle $\alpha$ of the thyristors $T_1$ to $T_{12}$ is large and close to 90°, the said voltage $V_m$ (FIG. 3(b)) is about two-fold of the pulsation content of the voltage $e_{d\alpha}$ between the terminals A and B (FIG. 3(a)). If the turn ratio between the interphase reactor 5a and the secondary winding 5b provided thereon is $N_2/2N_1=a_m=0.5$, and if the phase control angle $\beta$ of the thyristors $T_{13}$ and $T_{14}$ is set at or around 15°, the rectifier voltage $e_{d\beta}$ will become as shown in FIG. 3(c). Then the DC output voltage of the double 3-phase 12 pulse rectifier obtained by superposing the rectifier voltage $e_{d\beta}$ on the said voltage $e_{d\alpha}$, $e_d=e_{d\alpha}+e_{d\beta}$, becomes as shown in FIG. 3(d). The pulsation component therein is considerably reduced to have a waveform substantially equal to that obtainable when the number of phase is doubled to 24.

As described in the foregoing, the pulsation in the double three-phase 12 pulse rectifier according to the present invention can be reduced to the extent similar to that obtainable when the number of the phase is doubled to 24 easily if the phase control angle $\beta$ of the full-wave rectifier circuit 10 is changed in correspondence with the phase control angle $\alpha$ of the three-phase bridge rectifier circuits 1 and 3. It is assumed that the phase control angles $\alpha$ and $\beta$ are changed within the range that $0° \leq \alpha < 90°$ and $0° \leq \beta < 15°$. When the phase control angles $\alpha$ and $\beta$ are 0°, the device will be the same as the one including three-phase bridge rectifier circuits 1 and 3 and a full-wave rectifier circuit 10 with diodes instead of the thyristors $T_1$ to $T_{14}$ which are the rectifier devices. The relation of the phase control angle $\beta$ to the angle $\alpha$ may be, for instance, linear ($\alpha=6\beta$). Since the voltage $V_m$ is about 4-fold of the pulsation content in the voltage $e_{d\alpha}$ when the angle $\alpha$ is as small as close to 0° and two-fold of the pulsation content of the voltage $e_{d\alpha}$ when the angle $\alpha$ is as large as close to 90°, the said turn ratio $a_m$ will be 0.25 if the phase control angle $\alpha$ is the one with smaller operation range of the said double three-phase 12 pulse rectifier, the turn ratio $a_m$ is close to 0.5 if the angle $\alpha$ is the one with a larger operation range, and the turn ratio will be in the order of $a_m=0.35$ if the operation ragne extends all over the range.

Figure 5:
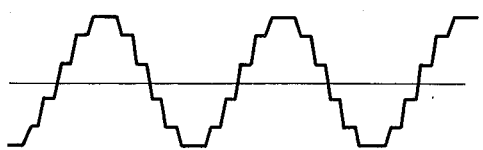
FIG. 5(a) shows the waveform of an AC current on the primary side of the circuit shown in FIG. 1.
FIG. 5(b) shows the waveform of an AC current on the primary side of the circuit shown in FIG. 4.
Figure 5:
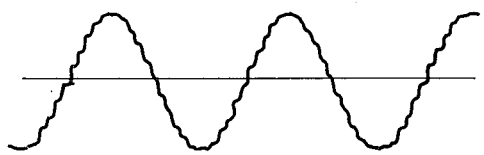

The above explains the function of reducing pulsation in a DC voltage $e_d$ achieved by the circuit of the present invention. The circuit has also a function to reduce harmonics of an AC input current $i_s$. FIG. 5(a) shows a waveform based upon the photograph of the waveform of the AC input current $i_s$ of the double three-phase 12 pulse rectifier of prior art. FIG. 5(b) shows a similar waveform of the double three-phase 12 pulse rectifier with the circuit according to the present invention. By comparing both waveforms, it is obvious that the waveform in the latter is remarkable improved. Such improvement is attributable to the following factors. As indicated in FIG. 4, as a load current $I_d$ flows to the secondary winding 5b provided on the interphase reactor 5a, a current $i_m$ flows to the interphase reactor 5a to offset the ampere-turn, thereby improving the waveform of the AC input current $i_s$.

The said current $i_m$ assumes a square waveform of the frequency 12f (provided that it be 0° during the phase control of the phase control angle $\beta$), and the amplitude thereof will be $i_m=(N_2/2N_1)\cdot I_d \equiv a_m I_d$. The currents $i_{d1}$ and $i_{d2}$ shown in FIG. 4 are both the currents passing through the thyristors $T_1$ to $T_{12}$. Even if the exciting current of the interphase reactor 5a could be disregarded, the following formulae should be held:

$$i_{d1}=I_d/2+i_m=(0.5+a_m)I_d>0$$

$$i_{d2}=I_d/2-i_m=(0.5-a_m)I_d>0$$

The turn ratio therefore should be less than 0.5.

It is well known that if DC current is connected instead of the load 7 in the double three-phase 12 pulse rectifier and if the phase control angle $\alpha$ is set at more than 90° and less than about 150°, it will behave an external commutated invertor. If the said circuit is connected between the central point of the interphase reactor 5a and the DC source, it can reduce harmonics of the AC input current $i_s$ due to the similar factor as above in this case, too.

When the resistance R of the load 7 is made 0, the circuit shown in FIG. 4 can be used as a variable reactor for compensating the reactive power. In this case there is no need to provide a DC power source newly because the secondary voltage of the interphase reactor can be rectified to replace the DC power source. Generally when the phase control angle $\alpha$ of the polyphase rectifier circuit with an interphase reactor is set at 90°, the average value $E_{d\alpha}$ of the DC output current $e_{d\alpha}$ will become $E_{d\alpha}=0$, providing no DC currents and hence supplying no reactive power. The rectifier voltage $e_{d\beta}$ which is obtained by rectifying the induced voltage of the secondary winding given to the interphase reactor, however, will become as shown in FIG. 3(c) to control the phase control angle $\beta$, thereby supplying a DC current $I_d$ to the circuit. By fixing the phase control angle $\alpha$ at 90° and making the phase control angle $\beta$ variable, therefore, lagging reactive power can be controlled.

The functions and performance of the circuit according to the present invention as well as the application thereof in the various electric apparatus have been sufficiently disclosed. In short, the present invention is widely applicable to electric apparatuses having multiplex polyphase rectifier circuits comprising an interphase reactor and plural rectifier circuits to reduce harmonics and pulsation therein respectively. In the rectifier where the phase control angles $\alpha$ and $\beta$ can be 0° in use, such rectifier circuits as the three-phase bridge rectifier circuits 1 and 3 in FIG. 4 and the full-wave rectifier circuit 10 may naturally use diodes as the rectifier devices. Although when the circuit shown in FIG. 4 is used as a rectifier, the phase control angle $\alpha$ should be $0° \leq \alpha < 90°$ disregarding the types of the rectifiers, the phase control angle $\beta$ has to be varied in correspondence with the pulsation of the DC output current $I_d$ used before the application of the present embodiment. For instance, the phase control angle $\beta$ will be $0° \leq \beta < 15°$ in the case of the rectifier shown in FIG. 4.

Although the above describes the embodiments where the present invention is applied to a double three-phase 12 pulse rectifier circuit comprising a star-connection and a delta-connection, the present invention is not limited to such an embodiment but naturally applicable to other cases as far as the apparatus includes plural rectifier circuits and an interphase reactor interposed therebetween. The variable range of the said phase control angle $\beta$ may be $0 \leq \beta < \frac{1}{2}$ pulsation cycle of the rectifier output for wider applications.

As is described referring to embodiments in the foregoing, in the present invention the secondary winding is provided to the said interphase reactor of the multiplex polyphase rectifier circuit having an interphase reactor and plural rectifier circuits, and the voltage obtained by rectifying the voltage induced in the secondary winding is superposed, thereby using the current thus generated to reduce the harmonic current on the primary side as well as the pulsation of the DC current. The multiplex polyphase rectifier circuit can function as a rectifier, a variable branch reactor, or an external commutated invertor by selecting an appropriate phase control angle $\alpha$. In the case of a rectifier the angle is $0° \leq \alpha < 90°$, in the case of a branch reactor it is around 90°, and in the case of an external commutated invertor it is $90° < \alpha < 150°$.

I claim:

1. In a multiplex polyphase rectifier circuit including an interphase reactor and a plurality of rectifier circuits, a harmonic and pulsation reducing circuit comprising a secondary winding associated with said interphase reactor, and an additional rectifier circuit rectifying the voltage induced in said secondary winding, said harmonic and pulsation reducing circuit being connected between a central point of said interphase reactor and a load in such a relation that said secondary winding is connected in series with said load, whereby the voltage obtained as a result of rectification of said induced voltage is superposed on the DC output voltage of said multiplex polyphase rectifier circuit.

2. A harmonic and pulsation reducing circuit as claimed in claim 1, wherein said plurality of rectifier circuits are constituted by thyristors, and said additional rectifier circuit is in the form of a hybrid bridge full-wave rectifier circuit.

3. In an external commutated inverter including an interphase reactor and a plurality of rectifier circuits constituted by thyristors, a harmonic and pulsation reducing circuit comprising a secondary winding associated with the said interphase reactor, and an additional rectifier circuit rectifying the voltage induced in said secondary winding, said harmonic and pulsation reducing circuit being connected between a central point of said interphase reactor and a DC power source in such a relation that said secondary winding is connected in series with said DC power source, whereby the voltage obtained as a result of rectification of said induced voltage is superposed on the DC output voltage of said DC power source.

* * * * *